United States Patent [19]
Calvet

[11] 3,772,795
[45] Nov. 20, 1973

[54] RANGE, TRAILING DISTANCE AND SAFE PASSING INDICATOR FOR MOTOR VEHICLE OPERATORS

[76] Inventor: Albert M. Calvet, 1864 N. Michigan Ave., Pasadena, Calif. 91104

[22] Filed: May 28, 1971

[21] Appl. No.: 147,782

[52] U.S. Cl............................ 33/264, 33/277, 356/3
[51] Int. Cl............................................. G01c 21/00
[58] Field of Search ................ 33/264, 277; 356/21, 356/3

[56] References Cited
UNITED STATES PATENTS

| | | | |
|---|---|---|---|
| 2,519,727 | 8/1950 | Yezdan | 33/277 |
| 1,311,253 | 7/1919 | Stern | 33/264 UX |
| 1,610,477 | 12/1926 | Sanford | 33/264 |
| 2,871,754 | 2/1959 | Marble | 356/21 X |
| 2,881,655 | 4/1959 | Eisenschink | 356/21 |
| 2,960,772 | 11/1960 | Robins | 33/277 |
| 3,434,214 | 3/1969 | Pratt | 33/264 |

FOREIGN PATENTS OR APPLICATIONS

| | | | |
|---|---|---|---|
| 1,039,048 | 8/1966 | Great Britain | 33/264 |

*Primary Examiner*—William D. Martin, Jr.
*Attorney*—Clarence A. O'Brien and Harvey B. Jacobson

[57] ABSTRACT

A transparent strip has two vertically spaced reference marks inscribed thereon. The strip is attached to the windshield and by properly orienting his head, a driver aligns the image of a leading vehicle on a scale that is inscribed between the reference marks. The scale informs the driver of the distance between his vehicle and that of the leading vehicle. The strip may be positioned elsewhere on the vehicle to measure the distance of a trailing vehicle.

7 Claims, 6 Drawing Figures

PATENTED NOV 20 1973

Albert M. Calvet
INVENTOR.

BY Clarence A. O'Brien
and Harvey B. Jacobson
Attorneys

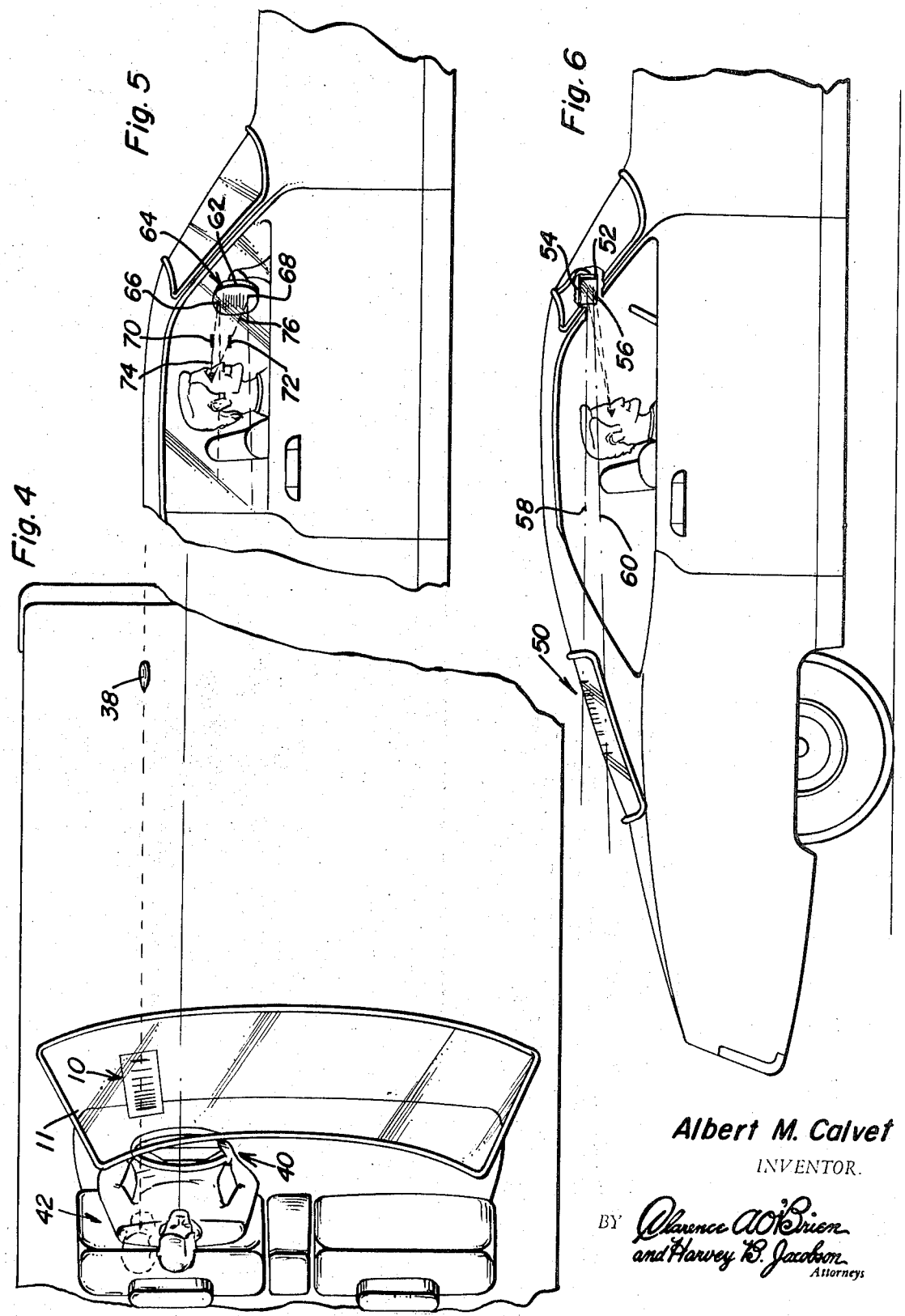

RANGE, TRAILING DISTANCE AND SAFE PASSING INDICATOR FOR MOTOR VEHICLE OPERATORS

The present invention relates to a simple and accurate scale for determining the distance between two vehicles. The scale renders the information when an image of a trailing or leading vehicle is superimposed on gradation marks of the scale.

BACKGROUND FOR THE INVENTION

As the number of automobiles on the nation's highways increases, the occurrence of collision between trailing and leading vehicles has become dangerously frequent. A first leading cause of these collisions rests with the driver of a trailing vehicle who tailgates the leading vehicle. Thus, in many situations when the leading vehicle brakes suddenly, by the time the trailing vehicle driver applies his brakes, it is too late and a collision occurs. A second principal cause for auto accidents is the execution of improperly timed passing. More particularly, passing drivers sometimes fail to maintain adequate distance between their own vehicle and a leading vehicle prior to the execution of passing. Thus, at the moment of passing when the passing driver's attention is diverted to the execution of his movement, the leading vehicle may stop suddenly and cause a collision with the trailing vehicle just prior to the time the trailing vehicle has completed lane switch-over. Actually, little has been done to reduce the frequency of these accidents other than enlarging brake lights on all vehicles to alert a trailing driver of sudden braking conditions. Although safety authorities have published lists of safe distances between vehicles, there is no convenient method available to drivers for ascertaining or measuring distances between vehicles. In essence, every driver is left to guess at his distance and if his estimate is wrong, even the alert driver is subject to a collision despite the brake lights on a leading car.

THE PRIOR ART

Several devices have been conceived for measuring distances between vehicles. One type is the optical range finder which works well on apparatus such as gun sights, cameras and the like. However, to focus an instrument during driving conditions is impractical. Although theoretically, radar devices could accurately determine the distance between vehicles, this equipment is expensive and could not be purchased by the ordinary driver. A more practical solution to the measurement problem resides in the utilization of a transparent strip on the windshield of a trailing vehicle. By including a scale on the transparent strip, the image of the leading car may be superimposed upon the scale when the driver properly orients his head so that his line of sight intersects the scale on the transparent strip as well as the leading vehicle. Then, by determining the position of a preselected leading vehicle body portion relative to its position on the scale, a distance measurement from the scale can be ascertained. The problem with these latter mentioned devices is that the image position relative to a reference mark on the scale requires a great deal of judgment on the part of the driver and due to parallax, readings at slightly different head orientations will be different. Accordingly, the prior art devices of the latter mentioned type fail to provide accuracy.

SUMMARY OF THE PRESENT INVENTION

The present invention is an improvement on the latter mentioned type of distance measuring device. In essence, the present invention includes several species that allow either a trailing or a leading vehicle to determine the distance between it and another vehicle. Accuracy is ensured by including two reference marks on a transparent strip, a scale being vertically disposed between the reference marks. As will be presently explained, both reference marks must be aligned with preselected objects so as to decrease the effect of parallax and increase the accuracy of the measurement.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 4 is a partial top plan view illustrating the change in driver position before and during a measurement;

FIG. 5 is a partial side elevational view illustrating the second specie of the present invention to determine the distance of a trailing vehicle; and FIG. 6 is a partial sectional view illustrating a third form of the present invention to determine the distance of a trailing vehicle.

Figure 3:
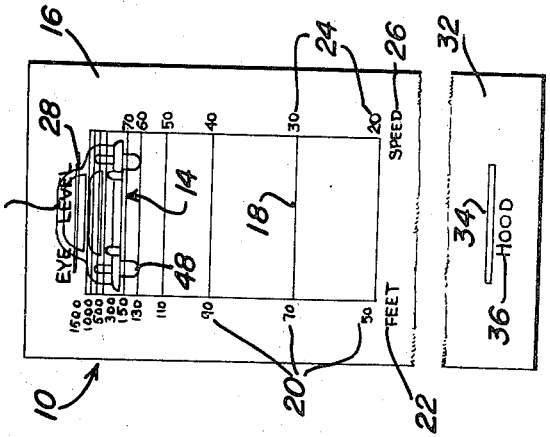
FIG. 3 illustrates a transparent strip as employed in the present invention, the strip having the image of a leading car superimposed thereon.
Figure 1:
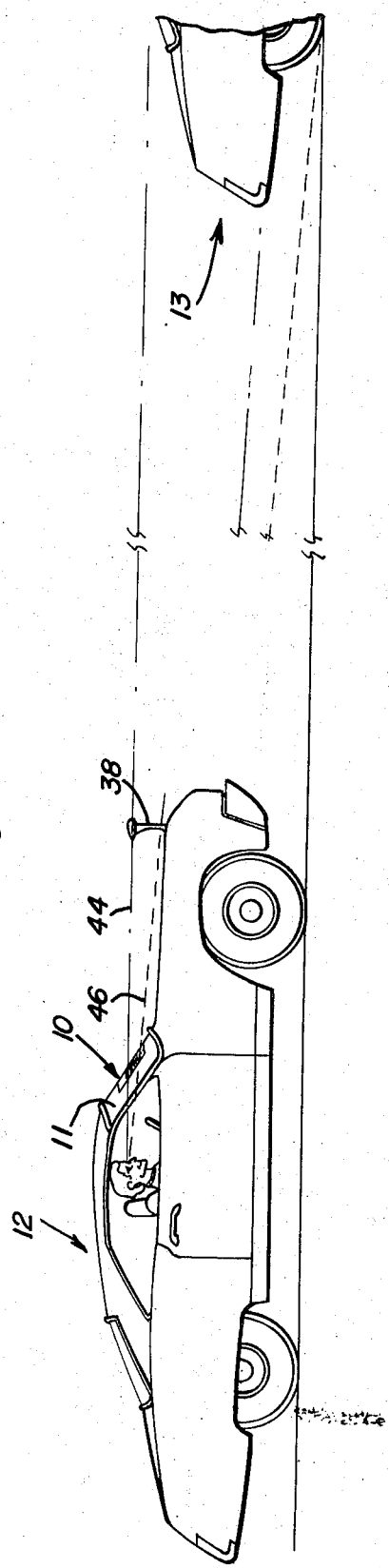
FIG. 1 is an elevational view illustrating the components of a first specie of the invention as mounted on a trailing vehicle.

Referring to the drawings, reference numeral 10 generally illustrates a rectangular transparent plastic strip or patch clearly illustrated in FIG. 3. As seen in FIG. 1, the strip is preferably attached to the inside of a trailing vehicle windshield 11 by utilizing a suitable adhesive. In FIG. 1, the trailing vehicle is indicated by reference numeral 12 while a leading vehicle is indicated by 13.

Figure 2:
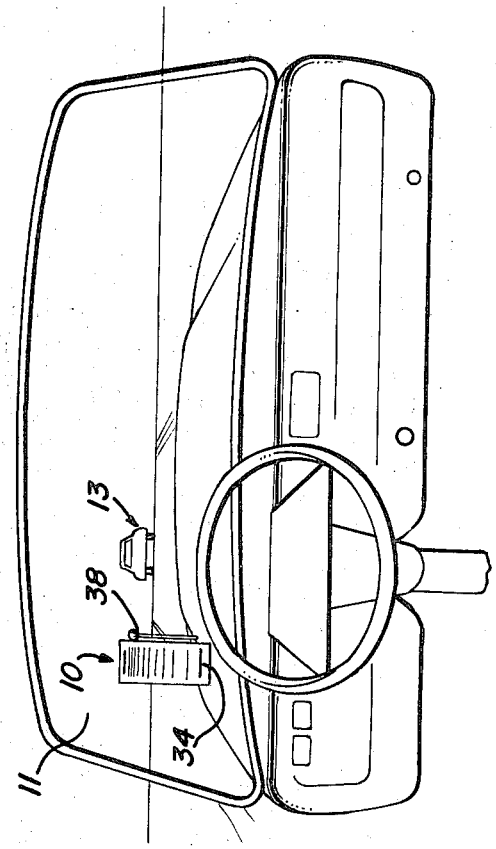
FIG. 2 illustrates the view of a trailing driver in a car equipped with the present invention.

As seen in FIG. 2, the strip 10 is positioned a bit to the left of the normal line of sight that a driver maintains during operation of his vehicle. In order to make a measurement, the driver must move his head to the left whereupon the image of leading vehicle 13 becomes superimposed upon the strip as illustrated in FIG. 3. The superimposed image is indicated by reference numeral 14. The strip can be fabricated from cellophane, vinyl or other transparent plastic material that easily adheres to glass. Material of this sort is frequently used in automobile decals. Of course, instead of using a strip, marks can be directly inscribed on the glass. As seen in FIG. 3, the strip has a main rectangular strip body 16 and a plurality of vertically spaced parallel lines 18 that serve as gradation marks for indicating distance. To the left of the lines are numerals 20 denoting distance measurement. The word "FEET" 22 is written below the numerals 20.

Inasmuch as safety authorities have computed the maximum safe speed as a function of distance between vehicles, this correlating speed data may be included to the right side of the gradation marks 18. Thus, a series of numerals 24 are imprinted alongside respective distance numerals. For a given distance measurement one can ascertain the maximum safe speed at which his vehicle should be driven. Reference numeral 26 indicates the word "SPEED" below the right column of numerals 24.

A first reference mark 28 denoted as "EYE LEVEL" (30) requires the driver of a trailing vehicle to align the rear window of the leading vehicle with the reference mark 28. A lower portion 32 of the strip 10 can be serrated so that it is removable from the main strip 16. The lower portion 32 has a second reference mark 34 thereon indicated by the word "HOOD" (36). The position of this lower portion is preset so that when the reference mark 34 becomes visually aligned with the outer edge of the driver's vehicle hood the driver's eye is at the correct distance from the main strip portion 16 to insure accuracy of measurement. As illustrated in FIG. 4, the driver usually maintains a normal position 40 for driving. In this position, his line of sight is not obstructed by the transparent strip 10. However, when he wishes to make a distance measurement to determine the distance between his vehicle and a leading vehicle, the driver shifts to the left as indicated by reference numeral 42 whereupon his line of sight intersects the strip 10. By properly orienting his head while in position 42, the eye level reference mark 28 shown in FIG. 3 will be superimposed on the rear window of the leading vehicle image. The reference mark 34 should be visually superimposed with the forward edge of the vehicle hood. Referring to FIG. 1, the line of sight intersecting the eye level reference mark 28 is indicated by reference numeral 44 (FIG. 1). The line of sight intersecting the hood reference numeral 34 is indicated in FIG. 1 as 46.

With the leading vehicle image 14 appearing as shown i FIG. 3, a determination is made as to which gradation line 18 the bottom of the image wheels falls on (48). In the case illustrated in FIG. 3, the reflected image indicates that a distance of 130 feet exists between the trailing vehicle 12 and the leading vehicle 13. The speed indication informs the driver that if he is traveling at a speed exceeding 60 miles per hour he is maintaining a dangerous condition.

Referring to FIGS. 1, 2 and 4, an alignment member in the form of a vertical rod 38 is seen to be mounted on the hood in forward aligned relation with the plastic strip 10. This rod is utilized to render a more accurate determination of the distance between the vehicles 12 and 13. The upper rod end is long enough to just meet line of sight 44. If this accuracy is desired, the rod is installed on the hood and when making measurements, the upper end of rod 38 should be visually superimposed with the upper reference mark 28. This takes the place of roughly determining where the upper reference 28 intersects the rear window of the leading vehicle. Of course, the reference marks 28 and 34 and the upper end of rod 38 and the forward outer edge of the hood define first and second paris, respectively, of vertically spaced visual reference portions of that form of the invention illustrated in FIGS. 1 through 4. The upper reference portions 28 and 38 defining the upper line of sight 44 and the second pair of reference portions including the mark 34 and the forward outer edge of the hood defining the second line of sight 46.

A second form of the invention is illustrated in FIG. 6 wherein an enlarged transparent plastic strip 50, similar in design to the aforementioned strip 10, is vertically positioned on the rear window of a leading vehicle. The conventional rear view mirror 52 in the vehicle has vertically spaced reference marks inscribed thereon. The upper reference mark is indicated by 54 while the lower mark is indicated by 56. In order to determine the distance between the leading vehicle and a trailing vehicle, the leading driver adjusts his head position until his reflected line of sight 58 intersects the upper reference mark 54 and an upper reference mark on strip 50, such as reference mark 28 (FIG. 3). A second reflected line of sight 60 must intersect the lower reference mark 56 on the rear view mirror 52 as well as intersecting a lower reference mark on strip 50, such as reference mark 34 (FIG. 3). With this alignment between reference marks on the rear view mirror and the transparent strip 50 on the rear window, an accurate determined of distance (and maximum safe speed) can be ascertained by noting the position of the wheels of the trailing vehicle image on the scale of the transparent strip 50 as reflected in rearview mirror 52.

A third embodiment of the present invention is illustrated in FIG. 5 wherein a transparent strip 64, similar to that illustrated in FIG. 3, is attached to a side view mirror 62. As in the case of the transparent strip 10 illustrated in FIG. 3, the transparent strip 64 has upper and lower reference marks 66 and 68. In order to employ the transparent strip 64 with accuracy, index marks 70 and 72 have to be formed on the side window so that when distance of a trailing vehicle is to be ascertained, the reflected line of sight 74 intersects the marks 70 and 66. Of course, the marks 70 and 72 will appear respectively superimposed upon marks 66 and 68. When the visual alignment of marks is obtained with a superimposed image of a trailing vehicle on the scale of the transparent strip 64, an accurate distance (and maximum safe speed) determination can be made.

Of course, it is to be appreciated that if the side view mirror 62 is mounted on a fender instead of a side door, the marks 70 and 72 should be inscribed on the vehicle windshield.

A method of determining a safe passing distance between the trailing vehicle and an approaching vehicle is provided whereby the subject device may be used in conjunction with a suitable table (not shown) based upon the speed of the vehicle to be passed and the speed at which the vehicle to be passed is overtaken.

It is anticipated that the spacings between lines 18 (FIG. 3) will have different scale factors in accordance with varying parameters of different vehicle models. These parameters include the height of the driver's eye above a roadway; the distance of a driver's eye from the windshield; and the slope of the windshield.

It may also be desirable to employ luminescent ink on the transparent strip which will result in better viewing at night. Regardless of the type of print used, night viewing is made possible by the superposition of a vehicle silhouette on the measurement scale of a strip. It will be appreciated that a vehicle may be equipped with two species of the invention to allow distance measurement of trailing and leading vehicles.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. In combination, a vehicle including a forward windshield and defining a driver's area behind the windshield, a device for measuring the distance between said vehicle and a second vehicle spaced in front of the first mentioned vehicle, said device comprising first means defining a first pair of vertically spaced visual reference portions on said windshield registered with a forward path of sight of an operator in said driver's area, second means defining a second pair of vertically spaced visual reference portions disposed forward of said windshield and spaced apart a greater vertical distance than the vertical distance between said first pair of reference portions, the upper reference portions of said first and second means being generally horizontally aligned and the lower reference portion of said second means being disposed at a lower elevation than the lower reference portion of said first means, said lower reference portions being positioned relative to the upper reference portions so that a line of sight extending between the upper reference portions intersects with a line of sight extending between the lower reference portions at a viewing point disposed in said driver's area at substantially eye level therein, one of said means including means defining a distance scale extending between the corresponding reference portions, whereby the registry of the image of said second vehicle, when viewed from said viewing point, on said scale will correctly indicate the distance between the first mentioned vehicle and said second vehicle when said vehicles are disposed on a straight road surface.

2. The structure of claim 1 wherein the lower reference portion of the second means comprises the outer hood edge of the first mentioned vehicle.

3. The structure of claim 1 together with indicia on the scale which represents maximum safe speed as a function of distance.

4. An assembly for measuring the distance from a leading vehicle to a trailing vehicle comprising a transparent patch secured to the rear window of the leading vehicle, the patch having vertically separated reference marks inscribed thereon, a distance scale inscribed on the patch between the reference marks, and a rear view mirror mounted in the leading vehicle for reflecting the image of the patch, the mirror having vertically separated index marks respectively lined up in visual superposition with the reference marks, whereby the position of the reflected image of the trailing vehicle on the scale indicates the distance between vehicles.

5. A device for measuring the distance from a leading vehicle to a trailing vehicle comprising a transparent patch secured to the side view mirror of a leading vehicle, the patch having vertically separated reference marks described thereon, a distance scale described on the patch between the reference marks, vertically separated index marks located on a side window adjacent the side view mirror for respective visual superposition with the reference marks whereby the position of the reflected image of the trailing vehicle on the scale indicates the distance between vehicles.

6. The structure of claim 5 together with indicia on the scale representing maximum safe speed as a function of distance.

7. A device for measuring the distance from a leading vehicle to a trailing vehicle comprising a transparent patch secured to the side view mirror of a leading vehicle, the side view mirror being mounted forwardly of the vehicle windshield, the patch having vertically separated reference marks inscribed thereon, a distance scale inscribed on the patch between the reference marks, vertically separated index marks located on the driver's side of the windshield, the index marks being visually superimposed on respective reference marks, whereby the position of the reflected image of the trailing vehicle on the scale indicates the distance between vehicles.

* * * * *